United States Patent [19]

Warkentin

[11] 3,860,730

[45] Jan. 14, 1975

[54] CHOCOLATE POWDER

[75] Inventor: Brian T. Warkentin, Sunnyvale, Calif.

[73] Assignee: Chocolate International, Inc., Belmont, Calif.

[22] Filed: Aug. 9, 1973

[21] Appl. No.: 386,974

[52] U.S. Cl................ 426/174, 426/45, 426/190, 426/227, 426/456, 426/471
[51] Int. Cl............................................. A23g 1/00
[58] Field of Search ............ 426/171, 172, 174, 45, 426/41, 214, 190, 227, 187, 456, 358, 471, 359

[56] References Cited
UNITED STATES PATENTS

| | | | |
|---|---|---|---|
| 2,863,772 | 12/1958 | Kempf | 426/171 X |
| 2,899,309 | 8/1959 | Rusoff | 426/171 |
| 3,027,257 | 3/1962 | Shenkenberg | 426/358 X |
| 3,236,833 | 2/1966 | Gordon et al. | 426/227 X |
| 3,397,061 | 8/1968 | Katz | 426/45 |
| 3,403,028 | 9/1968 | Stancioff et al. | 426/174 |
| 3,669,678 | 6/1972 | Kraft | 426/190 X |

FOREIGN PATENTS OR APPLICATIONS

| | | | |
|---|---|---|---|
| 562,660 | 9/1958 | Canada | 426/171 |

*Primary Examiner*—S. Leon Bashore
*Assistant Examiner*—Arthur L. Corbin

[57] ABSTRACT

A chocolate powder suitable for the preparation of chocolate milk drinks characterized by extended shelf life consisting essentially of the product obtained by dry blending cocoa powder and sugar, dissolving the blend in water to form a heavy syrup, pasteurizing the syrup, holding the pasteurized syrup at ambient temperature for at least 10 hours, treating the syrup with a small quantity of hyrogen peroxide, adding a small quantity of catalase to the syrup and then spray drying the syrup.

2 Claims, No Drawings

CHOCOLATE POWDER

BACKGROUND OF THE INVENTION

This invention relates to a chocolate powder useful in the preparation of chocolate milk drinks. Chocolate powders for this purpose are currently manufactured and sold in large quantities. Chocolate milk drinks prepared from currently available chocolate powders are characterized by relatively short shelf lives. Cocoa powder used in the preparation of chocolate powders for chocolate milk drinks are characterized by high bacteria content and by a substantial content of endo spores. Conventional preparation of chocolate milk drinks includes a pasteurization step which kills bacteria, but the endospores survive the pasteurization and germinate in the chocolate milk drink preparation with the result that there is active bacterial growth during storage and the product is spoiled. This spoilage problem has been a major one for dairies for many years and many dairies consider chocolate milk spoilage to be their largest single ongoing problem.

The product of the present invention is an essentially spore-free chocolate powder which can be mixed with milk and sugar to form a chocolate milk drink which has a shelf life or storage life at least as long as that of the milk component of the drink and substantially longer than the shelf lives of chocolate milk drinks manufactured using currently available chocolate powders.

BRIEF DESCRIPTION OF THE INVENTION

Pursuant to the present invention a relatively low fat cocoa powder, sugar and a vegetable stabilizer are dry blended to form an intimate mixture of the three components. The dry blend is dissolved in water to form a syrup having a high solids content. The syrup is pasteurized and is then held at ambient temperature for at least 10 hours during which endospores contained in the cocoa powder germinate. The small quantity of concentrated hydrogen peroxide is then added to the syrup and the resultant mixture is held at moderately elevated temperature for at least 10 hours. The syrup is then cooled to ambient temperature and the small amount of catalase dissolved in distilled water is added to the syrup and the resulting mixture is let stand for approximately an hour. The syrup is then spraydried at a temperature above the decomposition temperature of the catalase to produce a finished powder having a water content below about 7 percent.

DETAILED DESCRIPTION OF THE INVENTION

A chocolate powder which can be used to prepare a chocolate milk drink having excellent flavor, body and long storage life was prepared as follows: 85 parts by weight of low fat (10 to 12 percent fat) cocoa powder, 8 parts by weight of tapioca flour, 8 parts by weight of sweet whey powder, 4 parts by weight salt, 3 parts by weight carrageenin, 1.5 parts by weight of sugar and 0.5 parts by weight of vanillin were intimately mixed using a ribbon blender. The dry blend was dissolved in water to form a syrup having a solids content 25 percent by weight. The syrup was heated to 145°F. in a steam kettle and held at that temperature for 30 minutes. The syrup was then cooled to 50°F. and held at room temperature for 16 hours. Four parts by weight of 35 percent food grade hydrogen peroxide was added to the syrup which was then heated to 88°F. and held at that temperature for 11 hours. The syrup was then heated to 185°F. and held at that temperature for 10 minutes. The syrup was then cooled to room temperature (about 70°F.) and one part by weight of catalase dissolved in distilled water was added to the syrup. The syrup containing the catalase intimately mixed into it was allowed to stand for approximately 1 hour. The syrup was then spray dried at about 190°F. to produce a dried chocolate powder having a water content about 5 percent by weight. Chocolate milk drink is prepared using the chocolate powder by mixing 8 to 12 pounds of the chocolate powder, and 50 to 60 pounds of sugar with 100 gallons of low fat milk. The chocolate powder, sugar and milk are intimately mixed using conventional dairy mixing equipment. The chocolate milk drink was placed in storage and the mixture was plated once a week for one month and at the end of the month was still found to be completely free of any bacterial growth indicating that the chocolate powder prepared as described above was essentially completely spore-free. The detailed preparation of the chocolate powder described above can be varied in a number of respects and yield a spore-free product.

The essential components of the dry blend first prepared are cocoa powder, sugar and stabilizer. The cocoa powder is preferably a low fat cocoa having a fat content in the range 10 to 12 percent but in any event below about 12 percent. The quantity of sugar employed in the blend must be sufficient to stimulate spore generation when the syrup is allowed to stand at room temperature after the pasteurization step. The quantity of sugar used is generally in the range 1 to 5 percent of the weight of the cocoa powder used. Larger amounts of sugar can be incorporated in the mixture but generally the dairies which use the finished powder in the production of a chocolate milk drink prefer a low sugar syrup and prefer to do their own proportioning of milk, sugar and chocolate powder in formulating the final chocolate milk drink mixture.

The stabilizer in the above example is carrageenin. It functions to maintain the cocoa in dispersed condition and prevent agglomeration during storage. Carrageenin is the preferred stabilizer but other stabilizers are well known and are used by those skilled in the art. Other vegetable gums than carrageenins, such as the alginates and karaya are effective stabilizers and the cellulose gums, such as carboxymethylcellulose are also effective in stabilizing the dispersion of cocoa powder in milk. The quantity of stabilizer employed is in the range 2 to 10 percent by weight based on the amount of cocoa powder used, preferably 2 to 4 percent by weight.

The tapioca flour is a starch which functions as a thickening and smoothing agent in the final chocolate milk drink. Any starch may be used for this purpose and is effective but while starch does impart smoothness and thickening to the final product it is not an essential component of the chocolate powder.

Sweet whey powder is a desirable but not essential component of the final chocolate powder. Sweet whey powder is an article of commerce prepared by spray drying the whey byproduct obtained in the production of a sweet as opposed to a sharp cheese. It adds body, flavor and nutrient value to the final chocolate milk drink. When used it is employed in amounts in the range of 5 to 15 percent by weight based on the quantity of cocoa powder used.

The salt and vanillin components are added for flavoring, the quantity of salt used being in the range 3 to 5 percent by weight based on the weight of cocoa powder employed and the vanillin being used in amounts in the range 0.3 to 0.8 percent by weight based on the cocoa powder employed.

The dry blend produced in the first step of the process is dissolved in water to yield a heavy syrup having a solids content in the range about 20 to 30 percent by weight. Thirty per cent by weight represents about the upper limit of solids content which can be handled in the process with facility and syrups having solids contents lower than 20 percent by weight have the disadvantage of imposing a heavier burden on the spray drying system in the final step of the process.

After the dry blend of solids has been dissolved in water to produce the heavy syrup, the syrup is heated to pasteurization temperature to kill bacteria. The pasteurization conditions are generally about the same as those employed in the pasteurization of milk, the syrup being heated to a temperature in the range about 140° to 150°F. and held at that temperature for at least half an hour.

After the pasteurization step is completed the syrup is cooled to ambient temperature (50° – 70°F.) and allowed to stand at that temperature for at least 10 hours. During this period the endospores contained in the cocoa powder germinate and become vulnerable to thermal or chemical attack.

After the time allowed for spore germination has elapsed concentrated hydrogen peroxide is added to the syrup. The quantity of hydrogen peroxide added is in the range about 1 to 2 percent by weight of the syrup and ordinarily the 35 percent hydrogen peroxide available as an article of commerce is employed.

After addition of the hydrogen peroxide, which serves to sterilize the syrup by killing germinated endospores, the syrup is heated to moderately elevated temperature, usually in the range 80° to 100°F. and maintained at such temperature for 10 to 20 hours after which the syrup is heated to a higher temperature in the range about 180° to 200°F. and maintained at that higher temperature for at least 10 minutes as a finishing step in the kill of the germinated endospores.

After the hydrogen peroxide treatment the syrup is cooled to ambient temperature (50° – 70°F.) and from about 0.2 to 2.0 percent by weight based on the syrup of catalase is added to the syrup. The syrup containing the added catalase is allowed to stand for about an hour during which time the catalase catalyzes the decomposition of residual hydrogen peroxide so that at the end of the hour residual hydrogen peroxide has been completely decomposed.

After the catalase treatment the syrup is spray dried in a conventional spray-drying equipment to yield a powder having a moisture content in the range about 3 – 7 percent by weight. Spray drying temperature is above the decomposition temperature of catalase so the residual catalase is destroyed in the spray drying step. Catalase decomposes at 150°F. and the spray drying step is carried out at temperatures well above 150°F., for example, at temperatures in the range about 190° to 220°F.

The chocolate powder produced by the process above described is suitable in all respects for the preparation of chocolate milk drinks and permits the production of a chocolate milk drink product having a storage stability substantially superior to the chocolate powders currently available.

I claim:

1. A chocolate powder suitable for the preparation of chocolate milk drinks characterized by extended storage life consisting essentially of the product obtained by the process comprising the steps of:
   a. dissolving a mixture of cocoa powder, about 1 to 5 percent by weight, based on cocoa powder, of sugar and about 2 to 10 percent by weight, based on the cocoa powder, of a stabilizer in water to form a syrup having a solids content in the range 20 – 30 percent by weight,
   b. pasteurizing the syrup under conditions suitable for milk pasteurization and then holding it at 50° – 75°F. for at least 10 hours to permit germination of endospores contained in the cocoa powder,
   c. adding concentrated hydrogen peroxide to the syrup in amount sufficient to give the syrup a hydrogen peroxide content in the range 1 – 2 percent by weight,
   d. heating the syrup to 80° – 100°F. and maintaining it at such temperature for 10 to 20 hours and then heating the syrup to 180° – 200°F. and maintaining it at such temperature for at least 10 minutes,
   e. cooling the syrup to 50° – 75°F., adding catalase to the syrup in amount sufficient to give it a catalase content in the range 0.2 to 2.0 percent by weight and holding the syrup at 50° – 75°F. for about 1 hour after catalase addition to decompose residual hydrogen peroxide, and
   f. spray drying the syrup at a temperature above the decomposition temperature of catalase to produce a chocolate powder having a water content below 7 percent by weight.

2. A chocolate powder suitable for the preparation of chocolate milk drinks characterized by extended shelf life consisting essentially of the product obtained by the process comprising the steps of
   a. dry blending a quantity of cocoa powder, 6 to 15 percent by weight, based on the cocoa powder, of starch, 1 to 5 percent by weight, based on the cocoa powder, of sugar, 5 to 15 percent by weight, based on the cocoa powder, of whey powder and 2 to 4 percent by weight, based on the cocoa powder, of carrageenin,
   b. dissolving the mixture produced in step (a) in water to form a syrup having a solids content in the range 20 – 30 percent by weight,
   c. heating the syrup to about 145°F. and maintaining it at that temperature for at least 30 minutes,
   d. cooling the syrup to about 50° – 75°F. and maintaining it at such temperature for at least 10 hours to permit germination of endospores contained in the cocoa powder,
   e. adding concentrated hydrogen peroxide to the syrup in amount sufficient to give the syrup a hydrogen peroxide content in the range about 1 to 2 percent by weight,
   f. heating the syrup containing hydrogen peroxide to a temperature 80° – 100°F. and maintaining it at such temperature for at least 10 – 20 hours,
   g. then heating the syrup to a temperature in the range 180° – 200°F. and maintaining it at such temperature for at least ten minutes,
   h. cooling the syrup to about 50° – 75°F. and adding catalase to the syrup in amount sufficient to give the syrup a catalase content in the range 0.2 to 2.0 percent by weight and maintaining the syrup containing added catalase at about 50° – 75°F. for about one hour to decompose residual hydrogen peroxide and i. spray drying the syrup at a temperature at least 150°F. to produce a chocolate powder having a water content below about 7 percent by weight.

* * * * *